(12) United States Patent
Lutz et al.

(10) Patent No.: US 12,463,840 B2
(45) Date of Patent: *Nov. 4, 2025

(54) HOT PLUGGABLE PACKET ENERGY TRANSFER RECEIVER

(71) Applicant: VoltServer Inc., East Greenwich, RI (US)

(72) Inventors: Charles Noah Lutz, Providence, RI (US); Jonathan Casey, North Kingstown, RI (US); Stanley Mlyniec, Coventry, RI (US); William J. Fox, Raleigh, NC (US)

(73) Assignee: VoltServer Inc., East Greenwich, RI (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/504,603

(22) Filed: Nov. 8, 2023

(65) Prior Publication Data

US 2025/0150292 A1    May 8, 2025

(51) Int. Cl.
*H04L 12/10* (2006.01)
*G06F 1/28* (2006.01)

(52) U.S. Cl.
CPC .............. *H04L 12/10* (2013.01); *G06F 1/28* (2013.01)

(58) Field of Classification Search
CPC .................................. H04L 12/10; G06F 1/28
See application file for complete search history.

(56) References Cited

U.S. PATENT DOCUMENTS

| 6,856,137 B2 | 2/2005 | Roden et al. |
| 7,091,739 B2 | 8/2006 | Williams |
| 8,068,937 B2 | 11/2011 | Eaves |

(Continued)

FOREIGN PATENT DOCUMENTS

| WO | 2017/139289 A1 | 8/2017 |
| WO | 2022/081778 A1 | 4/2022 |
| WO | 2023/014595 A1 | 2/2023 |

OTHER PUBLICATIONS

International Searching Authority/EP, International Search Report and Written Opinion of the International Searching Authority, Application No. PCT/US2024/052503, dated Mar. 31, 2025, 15 pages.

(Continued)

*Primary Examiner* — Jaweed A Abbaszadeh
(74) *Attorney, Agent, or Firm* — Sunstein LLP

(57) ABSTRACT

A packet energy transfer (PET) receiver comprising receiver front-end circuitry including an input, an output, and at least one switch connected at the output. There is receiver output control and conditioning circuity including an input and an output to be connected to an electrical load. There is a synchronizer circuit to close the switch to allow power to flow into the receiver output control and conditioning circuitry during each of the first plurality of transfer periods of the transmitter and to open the switch to prevent power to flow into the receiver output circuitry during a first plurality of sample periods. There is a load controller that disables the synchronizer circuit and operates the switch to close it and allow power to flow into the receiver output control and conditioning circuitry during subsequent transfer periods and to open the switch to prevent power to flow during a subsequent sample periods.

51 Claims, 11 Drawing Sheets

(56) References Cited

U.S. PATENT DOCUMENTS

| | | |
|---|---|---|
| 8,781,637 B2 | 7/2014 | Eaves |
| 9,184,795 B2 | 11/2015 | Eaves |
| 9,419,436 B2 | 8/2016 | Eaves et al. |
| 9,705,314 B2 | 7/2017 | Kuznetsov |
| 9,853,689 B2 | 12/2017 | Eaves |
| 9,893,521 B2 | 2/2018 | Lowe et al. |
| 10,468,879 B2 | 11/2019 | Eaves |
| 10,541,543 B2 | 1/2020 | Eaves |
| 10,608,466 B1 | 3/2020 | Wildstone |
| 10,714,930 B1 | 7/2020 | Weiss et al. |
| 10,735,105 B2 | 8/2020 | Goergen et al. |
| 10,819,146 B2 | 10/2020 | Kimura |
| 11,356,012 B2 | 6/2022 | Liu et al. |
| 11,467,197 B2 | 10/2022 | Schweitzer, III et al. |
| 11,499,997 B2 | 11/2022 | Eaves |
| 11,622,468 B1 | 4/2023 | Welsko |
| 12,099,376 B2 | 9/2024 | Goergen et al. |
| 2009/0204268 A1 | 8/2009 | Eaves |
| 2011/0233998 A1* | 9/2011 | Tajima .................. H04L 12/10 307/18 |
| 2013/0103220 A1 | 4/2013 | Eaves |
| 2016/0294500 A1 | 10/2016 | Chawgo et al. |
| 2017/0214236 A1 | 7/2017 | Eaves |
| 2017/0229886 A1 | 8/2017 | Eaves |
| 2018/0123360 A1 | 5/2018 | Eaves |
| 2018/0313886 A1 | 11/2018 | Mlyniec et al. |
| 2019/0222259 A1 | 7/2019 | Mazumder et al. |
| 2019/0342011 A1* | 11/2019 | Goergen ............ H04B 10/0779 |
| 2020/0295559 A1 | 9/2020 | Eaves et al. |
| 2021/0135890 A1* | 5/2021 | Arduini .................. G06F 1/305 |
| 2021/0223839 A1 | 7/2021 | Goergen |
| 2022/0311240 A1 | 9/2022 | Casey |
| 2022/0385334 A1 | 12/2022 | Jones et al. |
| 2022/0393455 A1 | 12/2022 | Brower |
| 2023/0221380 A1 | 7/2023 | Shea et al. |
| 2023/0223988 A1 | 7/2023 | Arduini et al. |
| 2024/0168533 A1 | 5/2024 | Arduini et al. |

OTHER PUBLICATIONS

International Searching Authority/EP, International Search Report and Written Opinion of the International Searching Authority, Application No. PCT/US2024/052506, dated Mar. 4, 2025, 14 pages.

Voltserver Inc., U.S. Patent Application titled "Transmitter for a Packet Energy Transfer System," U.S. Appl. No. 18/504,614, filed Nov. 8, 2023, 45 pages.

Voltserver Inc., U.S. Patent Application titled "A Multi-Drop Packet Energy Transfer Receiver," U.S. Appl. No. 18/504,620, filed Nov. 8, 2023, 47 pages.

International Searching Authority/EP, International Search Report and Written Opinion of the International Searching Authority, Application No. PCT/US2024/052504, dated Mar. 6, 2025, 15 pages.

* cited by examiner

HOT PLUGGABLE PACKET ENERGY TRANSFER RECEIVER

TECHNICAL FIELD

The present invention relates to packet energy transfer (PET) receiver and more particularly to such a PET receiver that may be connected to an energized PET transmission line, i.e. it is "hot pluggable."

BACKGROUND ART

Digital electric power, or digital electricity, can be characterized as any power format where electrical power is distributed in discrete, controllable units of energy. Packet energy transfer (PET) is a type of digital electric power protocol disclosed in U.S. Pat. Nos. 8,068,937, 8,781,637 and international patent application PCT/US2017/016870, filed 7 Feb. 2017 (each incorporated by reference herein and together referred to as Eaves 2012).

The primary discerning factor in a digital power transmission system compared to traditional, analog power systems is that the electrical energy is separated into discrete units; and individual units of energy can be associated with analog and/or digital information that can be used for the purposes of optimizing safety, efficiency, resiliency, control or routing. Since the energy in a PET system is transferred as discrete quantities, or quanta, it can be referred to as "digital power" or "digital electricity".

As described in Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to by Eaves 2012 as the "sample period", and the time period when the source is connected is referred to as the "transfer period". The rate of rise and decay of the voltage on the lines before, during and after the sample period reveal if a fault condition is present on the power transmission lines. Measurable faults include, but are not limited to, short circuit, high line resistance or the presence of an individual who has improperly come in contact with the lines.

Eaves 2012 also describes digital information that may be sent between the source and load controllers over the power transmission lines to further enhance safety or provide general characteristics of the energy transfer, such as total energy or the voltage at the load controller terminals. One method for communications on the same digital power transmission lines as used for power was further described and refined in U.S. Pat. No. 9,184,795 (Eaves Communication Patent). One application of a digital power distribution system is to safely distribute direct-current (DC) power in digital format and at elevated voltage from the source side of the system to the load side. U.S. Pat. No. 9,853,689 (Eaves Power Elements) describes the packaging of the source side components of Eaves 2012, in various configurations, into a device referred to as a digital power transmitter.

U.S. Pat. No. 9,419,436 (Eaves Receiver Patent) describes the packaging of various configurations of the load side components of Eaves 2012 into a device referred to as a digital power receiver. U.S. Pat. No. 9,893,521, "Digital Power Network Method and Apparatus", hereafter referred to as "Lowe 2014", introduced the concept of multiple sources of power and multiple loads connected together safely in a digital power network using Packet Energy Transfer. The concept of a power control element (PCE) was introduced in Lowe 2014 as a primary component in a digital power network. U.S. patent application Ser. No. 15/963,582 (Mlyniec 2017) describes methods for verifying digital electricity line integrity, which includes applying a bias to the transmission line during the sample period, synchronizing the start times of respective sample periods on first and second transmission lines, among other methods. U.S. Pat. No. 10,714,930 (Weiss 2018) describes the usage of carrier wave detection to measure the impedance of a transmission line in a power-distribution system.

Further improvements in PET systems are desirable, especially as commercial demand for such systems grow.

SUMMARY OF THE EMBODIMENTS

The benefits and advantages of the present disclosure over existing systems will be readily apparent from this Summary of the Embodiments and the Detailed Description of Specific Embodiments to follow.

One skilled in the art will appreciate that the present teachings can be practiced with embodiments other than those summarized or disclosed below.

In one aspect the disclosure features a packet energy transfer (PET) receiver configured to be electrically connected to at least one energized PET transmission line, the at least one energized PET transmission line configured to be electrically connected to a PET transmitter. The PET receiver comprises a receiver front-end circuitry including a front-end input configured to be electrically connected to the at least one energized PET transmission line, a front-end output, and at least one switch connected at the front-end output. There is receiver output control and conditioning circuity including an input connected to the at least one switch of the receiver front-end circuitry and an output configured to be connected to an electrical load. There is a synchronizer circuit configured to detect a start of a first plurality of transfer periods by the PET transmitter; the synchronizer circuit causing the at least one switch of the receiver front-end circuitry to close in order to allow power to flow into the receiver output control and conditioning circuitry for a predetermined period of time during each of the first plurality of transfer periods and then causing the at least one switch of the receiver front-end circuitry to open in order to prevent power to flow into the receiver output circuitry during a first plurality of sample periods of the PET transmitter. There is a load controller operably connected to the receiver front-end circuitry, the receiver output control and conditioning circuity, and the synchronizer circuit. After the first plurality of transfer periods, the load controller disables the synchronizer circuit and operates the at least one switch to close the at least one switch in order to allow power to flow into the receiver output control and conditioning circuitry during subsequent transfer periods and to cause the at least one switch to open in order to prevent power to flow into the receiver output circuitry during a subsequent sample periods.

In other aspects of the disclosure one or more of the following features may be included. The receiver output control and conditioning circuity may include a load controller supply configured to provide power to the load controller. The load controller supply may include a down converter to provide a reduced output voltage to the load controller. The load controller supply may include a current limiter to limit current drawn by the down converter during start-up of the PET receiver. The load controller supply may be configured to operate in an off or low power mode to limit current drawn by the down converter during start-up of the PET receiver. After the first plurality of transfer periods and the first plurality of sample periods the load controller supply may be operational and may begin to provide power to the load controller. The PET receiver may have a start-up input impedance that is sufficient to limit a current drawn by the PET receiver to below a current level that would indicate a fault on the at least one energized PET transmission line. The current level drawn by the PET receiver may include at least a minimum level of margin. The PET receiver may have a start-up input impedance that is at least two times an impedance level that would indicate a fault on the at least one energized PET transmission line. The start-up input impedance may be at least one order of magnitude higher than the impedance level that would indicate a fault on the at least one energized PET transmission line. The at least one switch may include a first pair of switches operated under the control of the synchronizer circuit to close the first pair of switches in order to allow power to flow into the receiver output control and conditioning circuitry for a predetermined period of time during each of the first plurality of transfer periods and then to cause the first pair of switches to open in order to prevent power to flow into the receiver output circuitry during a first plurality of sample periods. The at least one switch may include a second pair of switches operated under the control of the load controller to close the second pair of switches in order to allow power to flow into the receiver output control and conditioning circuitry during the subsequent transfer periods and to cause the second pair of switches to open in order to prevent power to flow into the receiver output circuitry during the subsequent sample periods.

In additional aspects of the disclosure one or more of the following features may be included. The synchronizer circuit may include a voltage sensor to detect a PET transmission line voltage across the receiver front-end input and a detector circuit configured to detect, in response to a PET transmission line voltage, the beginning of each of the first plurality of transfer periods. The receiver front-end circuitry may further include a bias circuit controlled by the load controller to enable communications via the PET transmission line. The receiver output control and conditioning circuity may include a bootstrap capacitor connected across its input to provide power to a load controller supply circuit during the each of the first plurality sample periods and each of the subsequent sample periods. The bootstrap capacitor may have a capacitance value minimized to maintain a required minimum voltage across the load controller supply. The receiver output control and conditioning circuity may include a bulk capacitor connected between the load controller supply circuit and the load and may further include a bulk capacitor switch connected in series with the bulk capacitor and operated under the control of the load controller to limit a current supplied to the bulk capacitor when charging. The bulk capacitor may have a capacitance value to support a maximum desired load current and a maximum allowable output voltage ripple. The receiver output control and conditioning circuity may include a load switch under the control of the load controller to selectively connect and disconnect the load to the receiver output control and conditioning circuitry. The receiver output control and conditioning circuity may include a current limiter connected in series with the bulk capacitor to limit a current supplied to the bulk capacitor when charging. There may be a current limiter switch configured to close synchronously with a start of each transfer period and open during a start of each sample period. The synchronizer circuit may include an output driver configured to open and close the at least one switch. The synchronizer circuit may include a synchronizer power supply configured to power the output driver, the voltage sensor, and the transfer period detector. The load controller may be configured to sense a voltage on the front-end input of the receiver front-end circuitry during the sample period to determine if a fault is present on the PET transmission line. The receiver front-end circuitry may include a plurality of front-end circuits each including a front-end input configured to be electrically connected to the at least one energized PET transmission line; a front-end output; and at least one pair of switches connected at the front-end output. The load controller may be configured to selectively control connection of each of the plurality of front-end circuits to the receiver output control and conditioning circuity to ensure the sample periods of each of the plurality of front-end circuits do not overlap. The receiver output control and conditioning circuity may include a bulk capacitor connected between the load controller supply circuit and the load and a current limiter with a current limiter switch connected in series with the bulk capacitor to limit a current supplied to the bulk capacitor when charging. The current limiter switch may be configured to close when at least one of the plurality of front-end circuits is in a transfer period and open when all of the plurality of front-end circuits are in a sample period.

These and other features of the invention will be apparent from the following detailed description and the accompanying figures.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
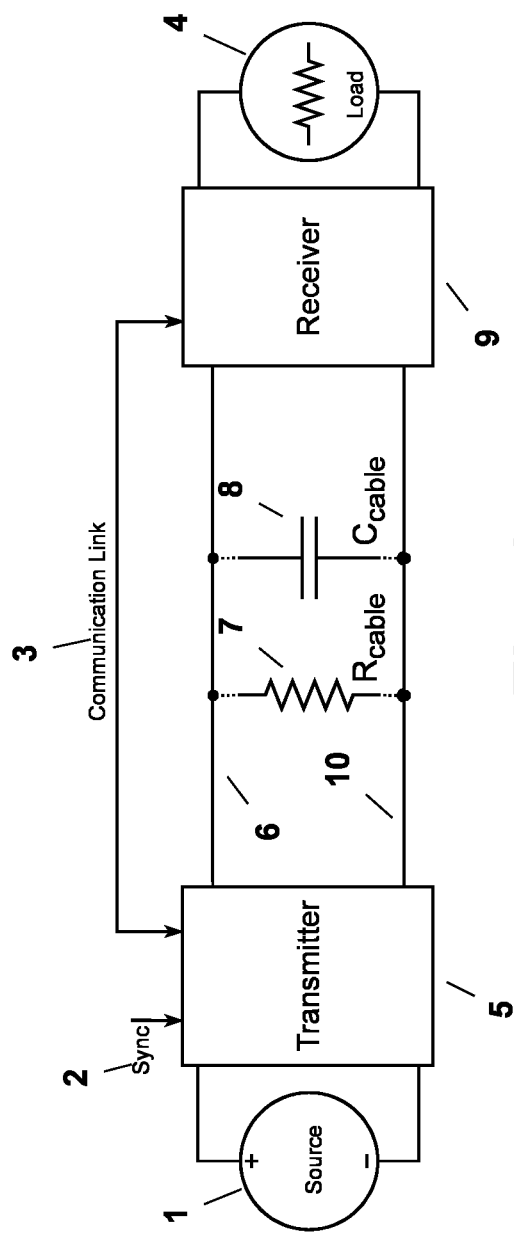
FIG. 1 is a block diagram of a point-to-point digital electricity system.

The disclosure and the various features and advantageous details thereof are explained more fully with reference to the non-limiting embodiments and examples that are described and/or illustrated in the accompanying drawings and detailed in the following description. Various aspects of the subject matter discussed in greater detail below may be implemented in any of numerous ways, as the subject matter is not limited to any particular manner of implementation. Examples of specific implementations and applications are provided primarily for illustrative purposes.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms "includes," "including," "comprises," and "comprising" specify the presence of the stated elements or steps but does not preclude the presence or additional of one or more other elements or steps.

Throughout this disclosure, the term "impedance" used in an electrical context refers to the electrical resistance, capacitance, and inductance. Unless otherwise specified, an increase in impedance refers to an increase in resistance, a decrease in capacitance, and/or an increase in inductance. Conversely, a decrease in impedance refers to a decrease in resistance, an increase in capacitance, and/or a decrease in inductance. One or more of these base electrical properties (i.e., resistance, capacitance, inductance) may not be depicted if not significant.

This disclosure in general relates to power distribution system safety protection devices, for example, power distribution systems with electronic monitoring to detect and disconnect power in the event of an electrical fault or safety hazard, particularly where an individual has come in contact with exposed conductors. This disclosure is applicable to general power distribution and, exemplifications, to, e.g., electric vehicle charging, telecommunications and/or alternative energy power systems.

More specifically, this disclosure relates to fault-managed PET power systems for distributing power from a transmitter to one or more loads connected to receiver(s) on the same circuit without requiring a receiver, load or, in some systems, a cable to be present to maintain safe operation by monitoring the line characteristics. In addition, the disclosure relates to PET receivers with very high front-end impedance and high start-up input impedance that allow multiple receivers to be connected to a common transmission line (a "multi-drop" configuration) and a single transmitter such that they draw a limited amount of current/power that does not trip the line characterization safety detection of the transmitter.

Further, according to an aspect of this disclosure, receivers/loads may be added to a circuit at any time during operation of the circuit, which may be referred to herein as "hot pluggable" or as a "hot plug receiver". Such a hot pluggable receiver may also have very high front-end impedance and high start-up input impedance.

A simplified diagram of a digital-power system, as originally described in Eaves 2012 and further expanded upon in Mlyniec 2017 is shown in FIG. 1. The system performs the PET protocol when the power transmission lines 6 and 10 are periodically isolated from source 1 and load 4 via action of transmitter 5 and receiver 9. During this period of isolation, referred to as the sample period, the transmitter 5 performs measurements to verify the integrity of the transmission line to determine if energy transfer from the transmitter output should resume. As discussed in Eaves 2012, the rate of decay of the energy stored on the transmission lines can be observed and indicates whether there is a cross-line fault present on the transmission lines. The inherent line-to-line impedance of the transmission line is represented with resistance ($R_{cable}$) 7 and capacitor ($C_{cable}$) 8. From the perspective of the transmitter 5, this line-to-line, or cross-line, impedance also includes the cross-line impedance of the transmitter front-end and receiver front-end circuitry, referred to as the effective cross-line impedance.

PET Transmitter

Figure 2:
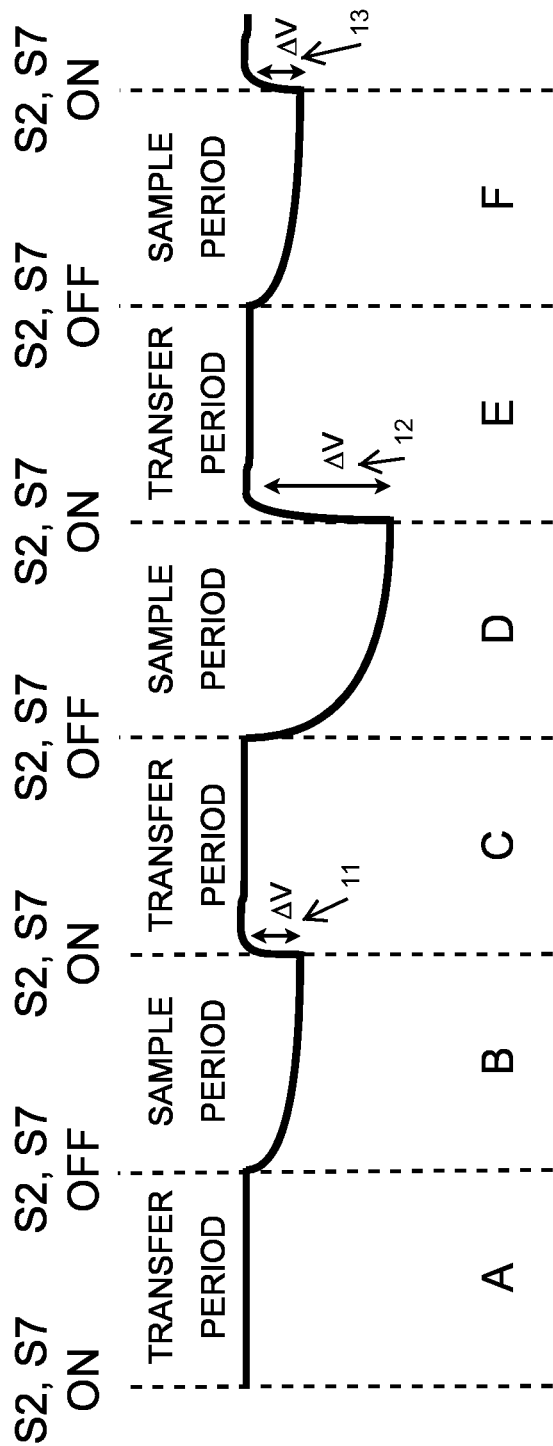
FIG. 2 is an illustration of a PET voltage waveform.
Figure 3:
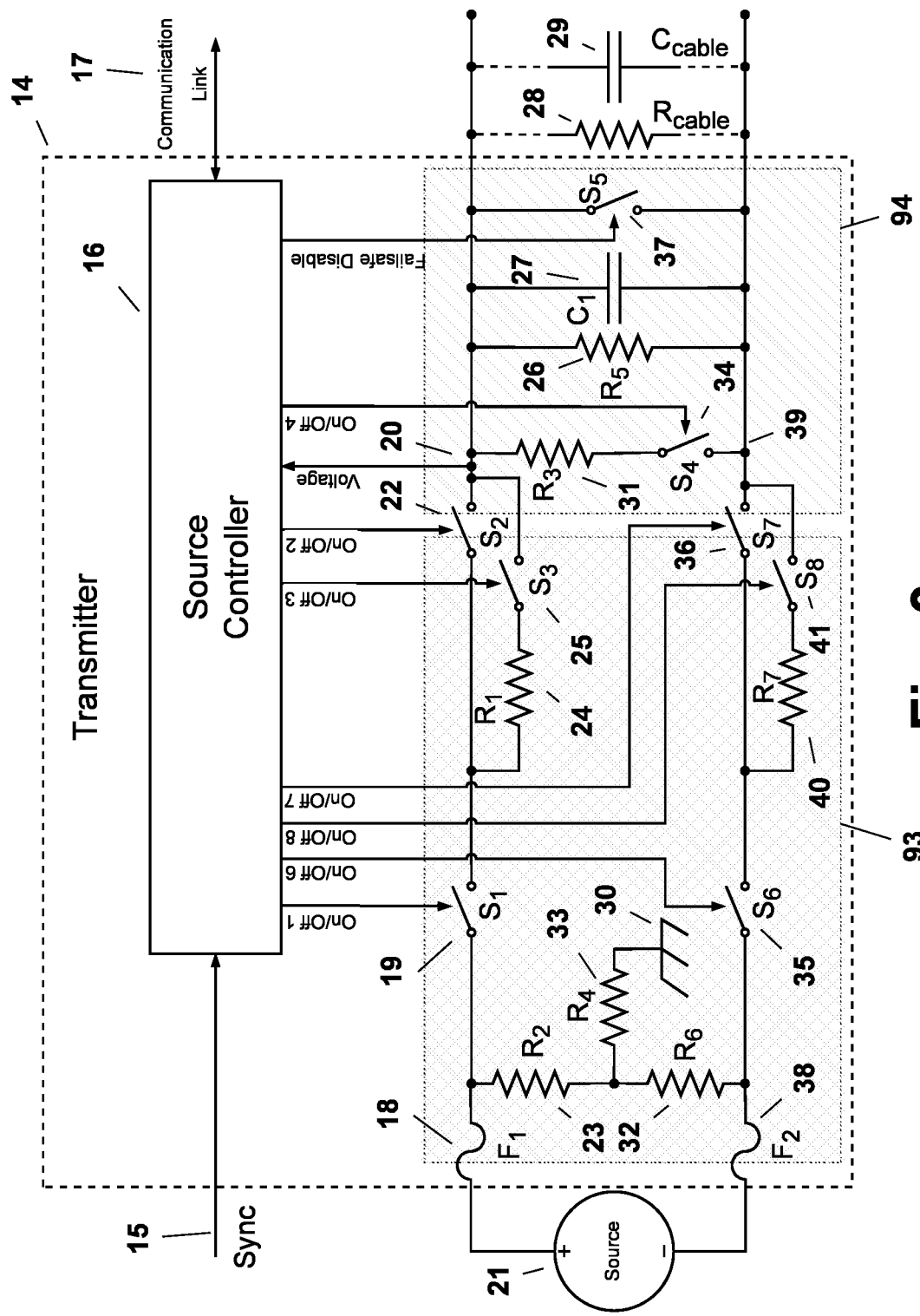
FIG. 3 is a block diagram of an embodiment of a PET transmitter for a digital electricity system.

FIG. 2 shows an example waveform of steady-state system operation of a PET system, according to aspects of this disclosure. During transfer periods A, C and E, switches ($S_2$) 22 and ($S_7$) 36 of transmitter 14, FIG. 3, are closed (set to a low-impedance state) and energy flows from the source 21, through the transmission lines, to any connected receivers and their attached loads (not shown). During sample periods B, D, and F, transmitter switches ($S_2$) 22 and ($S_7$) 36 are opened (set to a high-impedance state). Similarly, any connected receivers isolate their attached loads either passively (via reverse blocking action of diodes) or actively (via an electrically controlled switch such as a FET, BJT, etc.) from the transmission line. The transmitter source controller 16 may be configured to perform one or more of the PET protocol methods taught in Eaves 2012 and Mlyniec 2017 to determine whether a fault is present.

During sample periods, a voltage bias may or may not be applied by the transmitter. For example, as shown in FIG. 2, during sample periods B and F no bias is applied by transmitter 14, allowing the energy stored in the transmission line capacitance 29, transmitter capacitance 27 and any connected receiver capacitance to decay at a rate inversely proportional to the aggregate values of the cross-line resistance of the transmission lines, ($R_{cable}$) 28 and resistor ($R_5$) 26 within the transmitter 14. On the other hand, during sample period D the transmitter applies a negative bias by closing switch ($S_4$) 34, allowing the stored energy to decay at a rate inversely proportional to the aggregate values of the inherent cross-line resistance of the transmission lines ($R_{cable}$) 28 and resistors ($R_5$) 26 and ($R_3$) 31 within the transmitter 14. With or without a bias, if the associated pre-determined limits (according to the applicable PET protocol) have not been exceeded (i.e. no fault was detected), at the end of each sample period, switches ($S_2$) 22 and ($S_7$) 36 are closed, allowing energy from the source 21 to flow through the transmission lines, to ultimately deliver energy to the attached loads on any connected receivers during each transfer period.

Inherent in the PET waveform is a large $\Delta V$, or change in voltage that occurs in a short time frame during the transition between sample period and transfer period at points 11, 12, and 13, FIG. 2. This occurs when the transmitter closes the internal switches and charges the effective cross-line impedance of the system back to the voltage of source 21. This large rate of change with respect to time is also referred to as a high dV/dt event and it indicates the start of each transfer period.

With prior art PET systems, the PET protocol cannot begin until the transmission line and a receiver are connected to the PET transmitter, because there is not a sufficient level of cross-line capacitance in the transmitter and the transmission line to allow the PET protocol to operate properly. A prior art receiver having a discrete capacitor in its front end circuit would be connected to the transmission line to provide a sufficient amount of aggregate capacitance to run the PET protocol. However, with transmitter 14, FIG. 3, there is included a capacitor ($C_1$) 27 that adds additional cross-line impedance not present in prior art PET transmitters. The addition of capacitor ($C_1$) 27 allows the transmitter to begin the PET protocol before any receiver or transmission line is connected to transmitter 14. This is possible because capacitor ($C_1$) 27 provides a sufficient amount of cross-line capacitance at the output of the transmitter to allow the PET protocol to run. It should be noted that capacitor ($C_1$) 27 may or may not dominate the inherent capacitance on the transmission line or receiver front-end capacitance.

When switches ($S_2$) 22 and ($S_7$) 36 are opened, the charge stored in capacitors ($C_1$) 27 and ($C_{cable}$) 29 and any connected receivers decays at a rate that is inversely proportional to the additive values of resistors ($R_5$) 26 and ($R_{cable}$) 28. In this embodiment, the combination of resistors and capacitors/capacitance in the system may be referred to as the effective cross-line impedance, which is described more specifically in the following paragraph. The amount of charge contained in the effective cross-line impedance of the system is proportional to the voltage across the transmission line and can be measured at points 20 and 39 by Source Controller 16.

With transmitter 14 connected to the transmission line, even with no receivers/loads are connected to the transmission line, the presence of a cross-line fault as discussed in Eaves 2012 and Mylenic 2017, may still be determined. In this system, the effective cross-line impedance is comprised of the cross-line impedance of the transmission line (represented with resistor ($R_{cable}$) 28 and capacitor ($C_{cable}$) 29) and the cross-line impedance of the transmitter output, i.e. resistor ($R_5$) 26 and capacitor ($C_1$) 27. The transmitter 14 periodically isolates the power transmission lines from the source 21 and, even though there is no load or receiver connected, the transmitter 14 can still perform measurements on the power transmission line. This is accomplished by ensuring at the output of transmitter 14 there is a minimum effective cross-line capacitance to execute the PET protocol. With transmitter 14, a PET protocol can be executed even without it being connected to a transmission line, as capacitor ($C_1$) 27 provides the required effective minimum cross-line capacitance.

Minimum effective cross-line capacitance is an amount of capacitance which still allows the differentiation between a measurement with a fault and a measurement without a fault on the system. Based on the fault resistances supported by transmitter 14, known impedances in a working system, and sensitivity of the measurement apparatus, the minimum effective cross-line capacitance can be determined. At some low capacitance value (below the minimum effective cross-line capacitance), all values measured will be zero since all energy will be drained from the capacitance. This would be the case, for example, when operating at 4002 V without a cross-line fault present; with 200 kΩ (cross-line resistance, 5 pF of cross-line capacitance, and a delay of 10 μs before the initiation of taking measurements using an ADC with a resolution of 0.1 V. With these parameters, the transmitter cannot differentiate between actual fault conditions and the conditions when no fault is present in the system. Therefore, the PET protocol cannot be operated effectively.

If there is not an effective minimum cross-line capacitance provided by the inherent transmission line capacitance, a discrete capacitor, e.g. ($C_1$) 27, may be added to the transmitter as shown in FIG. 3 to achieve this effective minimum cross-line capacitance across the transmission line pair.

Transmitter 14 allows for digital electricity systems to behave in a manner similar to conventional AC or DC power distribution systems, which can be energized without a receiver or load connected. Prior art systems are designed to require a receiver to be present to initialize and execute the PET protocol. However, transmitter 14 supplies the minimum required effective cross-line capacitance for the PET protocol to operate via capacitor ($C_1$) 27. This allows for operation without a receiver or even transmission lines connected to the transmitter output, which has several benefits, including reduced start-up time and enabling operation with hot-pluggable receivers.

It should be noted that when MOSFETs are used for switch ($S_2$) 22 and switch ($S_7$) 36 of the transmitter 14, the output capacitance of those switches will effectively be seen at the output of the transmitter front-end 94. This effective capacitance can fulfill the minimum capacitance requirement with properly specified parts. While this avoids the cost of a discrete capacitor $C_1$ 27 on the transmitter output or relying on sufficient transmission line length always being present, it does require a more complex algorithm since the effective capacitance provided by the MOSFET output capacitance will change as the MOSFET drain-to-source voltage changes, which will need to be factored into the evaluation of whether or not a fault is present. Switches other than MOSFETs may be used provided there is sufficient effective capacitance across the switch.

It should be further noted that systems with significantly long transmission lines may prohibit use of discrete capacitor ($C_1$) 27 in the case the inherent capacitance approaches the maximum allowable transmission line capacitance. Above this maximum capacitance, the transmitter is no longer able to distinguish faults from normal operation and therefore must turn off its output. Transmitter 14 may include a switch (not shown) to switch discrete capacitor ($C_1$) 27 out of the circuit when the inherent capacitance approaches the maximum allowable transmission line capacitance. The Mlyniec 2017 reference introduces the high capacitance fault and may be referred to for those specific cases.

Transmitter 14 may further include a bias circuit to help verify transmission line integrity as shown in and described with respect to FIG. 2, sample period D. The combination of resistor ($R_3$) 31 and switch ($S_4$) 34 is a particular embodiment of a bias circuit. This bias circuit can also be used to perform in-line communications between the transmitter 14 and any connected receivers, as taught in the Eaves Communication Patent. Communication may also take place over a separate copper or fiber optic connection via Communication Link 17. Additionally, Mlyniec 2017 discusses the use of an external sync signal 15 for improved line measurement integrity. Alternatively or in addition, communications link 17 may be used to communicate with the receiver(s) connected to the transmission line and transmitter 14.

Transmitter 14 may additionally include switches ($S_1$) 19 and ($S_6$) 35 to provide secondary protection in the event of a single component failure in transmitter 14. Under normal operating conditions switches ($S_1$) 19 and ($S_6$) 35 are left closed. In the event of multiple component failures, protection is provided via fuses ($F_1$) 18 and ($F_2$) 38 and the failsafe switch ($S_5$) 37, forming a crowbar circuit. There may be included a soft start circuit comprising switch ($S_3$) 25, resistor ($R_1$) 24, switch ($S_8$) 41 and resistor ($R_7$) 40 which enables current-limited soft start functionality (i.e. the transmitter soft-start process). This soft start circuit charges the capacitive portion of the effective cross-line impedance of the system and the start-up input impedance (described below) of any connected receiver(s), protecting the transmitter circuitry from the large current spike that would occur otherwise when the transmitter first applies power to the transmission lines. Additionally, current limited earth ground 30 balance is provided via balance resistors ($R_2$) 23, ($R_6$) 32, and current-limiting resistor ($R_4$) 33.

In some alternative embodiments, some transmitter switches may be omitted. Instead of opening both switches ($S_2$) 22 and ($S_7$) 36 for the sample period, it is possible to open only one of those switches. This is not optimal as far as robust performance, but it may be sufficient in cost-sensitive applications. Similarly, instead of the soft-start circuit comprising switch ($S_3$) 25, resistor ($R_1$) 24, switch ($S_8$) 41 and resistor ($R_7$) 40, it could omit switch ($S_8$) 41 and resistor ($R_7$) 40 in favor of using switch ($S_7$) 36, or omit switch ($S_3$) 25 and resistor ($R_1$) 24 in favor of using switch ($S_2$) 22.

Components within box 93 may be considered the input conditioning and protection circuitry. These components add secondary protection to the system and condition the power from the source. Components within box 94 may be referred to as the PET front-end of the transmitter. These components are directly connected across the transmission line and directly measure or modify the properties of the transmission line. Switches ($S_2$) 22, ($S_3$) 25, ($S_7$) 36 and ($S_8$) 41 delineate the boundary between these two subsections of the transmitter circuitry.

Referring to FIG. 3, the combination of source controller 16; fuse ($F_1$) 18; switch ($S_1$) 19; switch ($S_2$) 22; resistor ($R_2$) 23; resistor ($R_1$) 24; switch ($S_3$) 25; resistor ($R_5$) 26; capacitor ($C_1$) 27; resistor ($R_6$) 32; resistor ($R_3$) 31; resistor ($R_4$) 33; switch ($S_4$) 34; switch ($S_6$) 35; switch ($S_7$) 36; switch ($S_5$) 37; fuse ($F_2$) 38; resistor ($R_7$) 40; and switch ($S_8$) 41 can be referred to as transmitter 14.

PET Receivers

Figure 4:
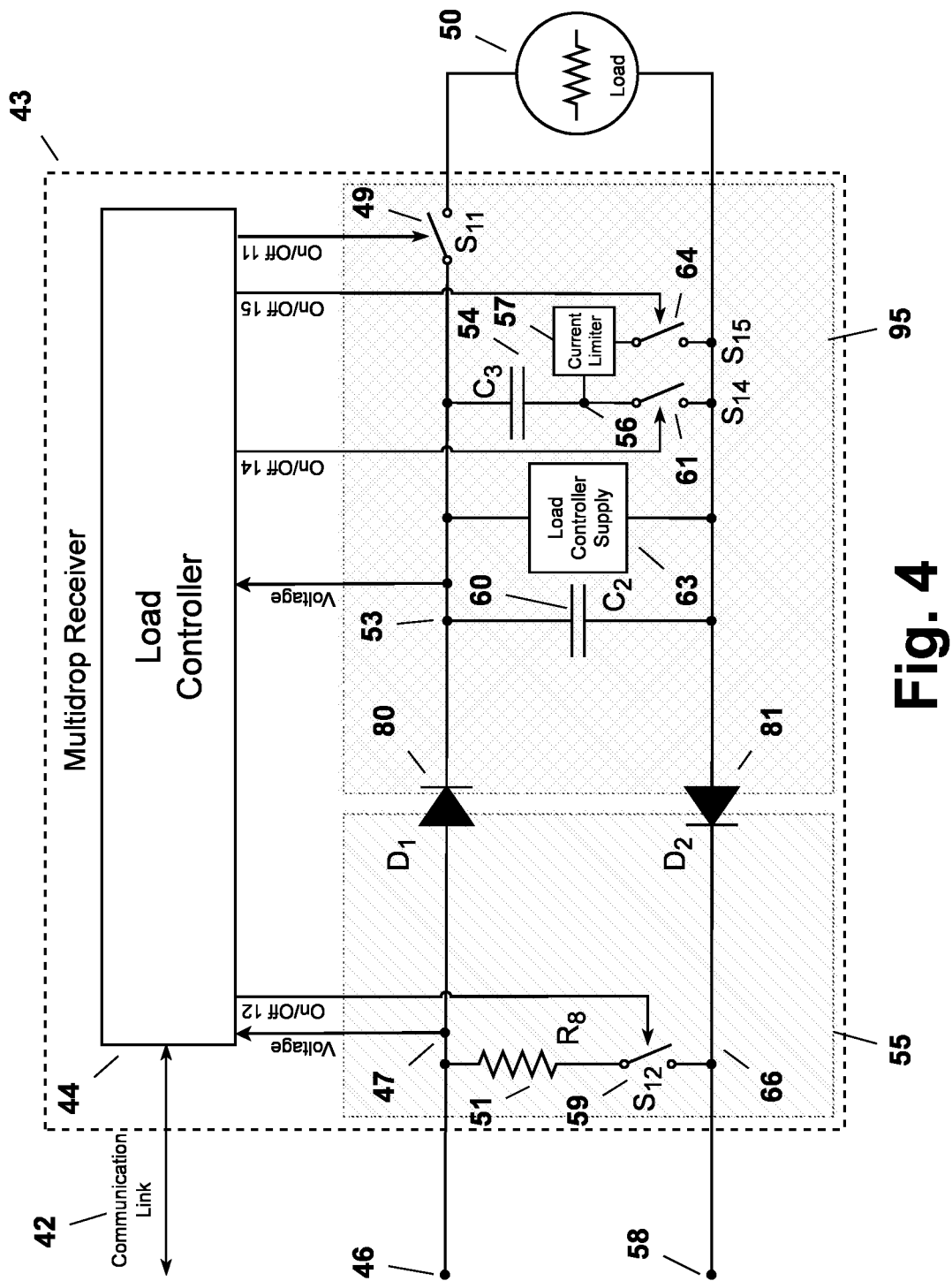
FIG. 4 is a block diagram of an embodiment of a PET multi-drop capable receiver for a digital electricity system.
Figure 5:
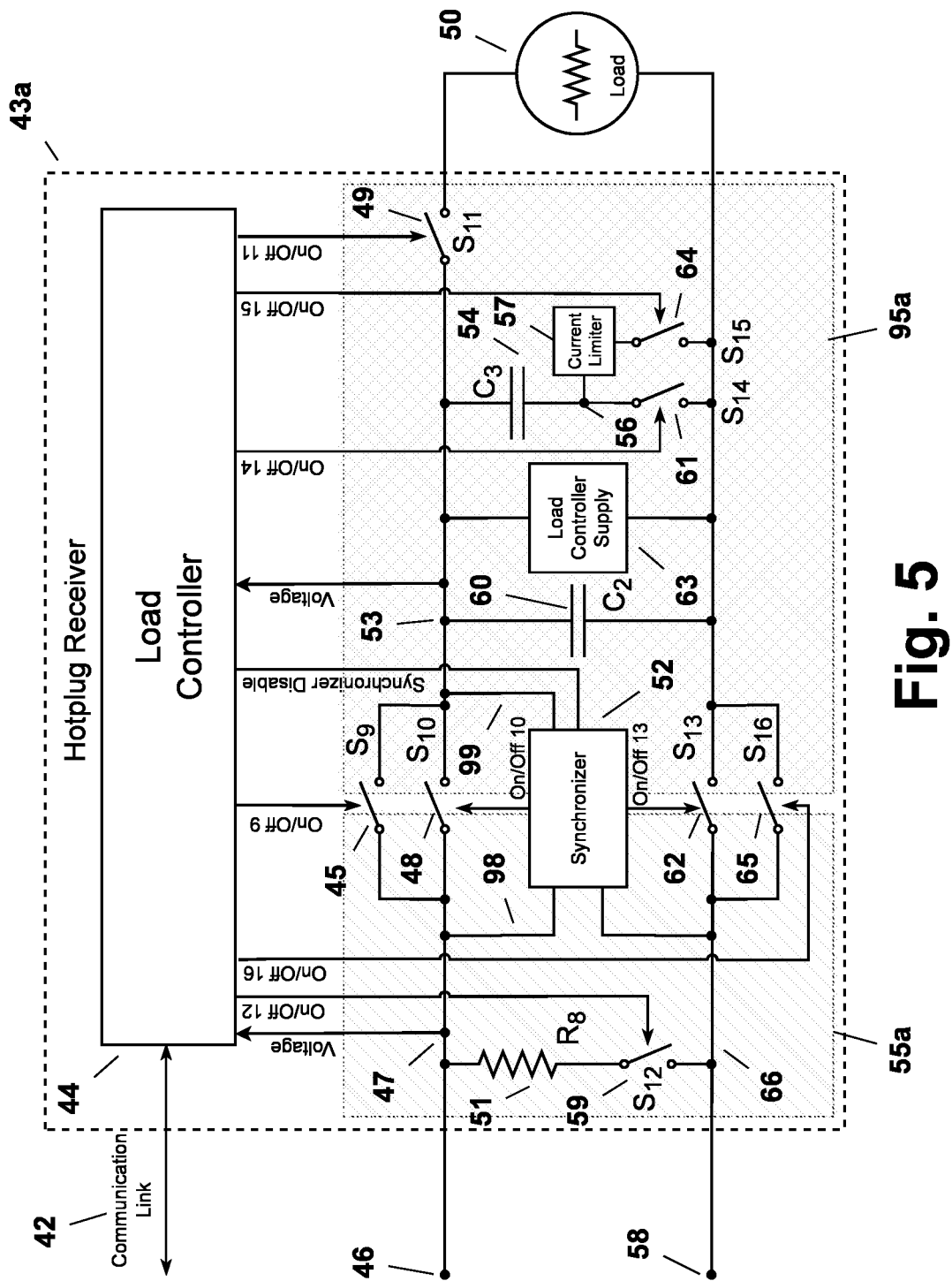
FIG. 5 is a block diagram of an embodiment of a hotplug capable PET receiver for a digital electricity system.

FIG. 4 and FIG. 5 show detailed block diagrams of two types of PET receivers according to aspects of this disclosure. One type, receiver 43 shown in FIG. 4, is configured for a multi-drop PET system, which means that the PET receivers have very high front-end impedance and high start-up input impedance allowing multiple receivers to be connected to a common transmission line without drawing, in the aggregate, an amount of current/power that would trip the line characterization safety detection of the PET transmitter. The other type, receiver 43a depicted in FIG. 5 is configured to be "hot pluggable", meaning receivers/loads may be electrically connected to an energized or de-energized transmission line without tripping the line characterization safety detection of the PET transmitter. This receiver also has very high front-end impedance, including high start-up input impedance.

In both receivers 43 and 43a their front-end impedance is the aggregate impedance of the components of front-end circuits 55 and 55a, respectively. With receiver 43a, there is a synchronizer circuit 52, shown in FIGS. 5 and 6, in front-end circuit 55a; however, only a portion of this circuit is included in the front-end impedance. That portion includes the components within box 96, FIG. 6, that are directly connected to the PET transmission lines and are considered part of the PET front-end circuitry 55a within the receiver 43a. The start-up input impedance of each receiver further includes the impedance of the additional components beyond the front-end circuits 55 and 55a up to and including the load controller supply 63 in the output control and conditioning circuitry 95 and 95a. Specifically regarding the hot pluggable receiver, switches may be selectively opened and closed to remove various components (i.e. the load controller supply 63) which contribute to the start-up input impedance from the circuit during sample periods (further described below). Therefore, in certain cases, the start-up input impedance may be equal to the front-end impedance.

The front end impedance is the impedance that is seen by the transmitter during normal operation of receivers 43 and 43a, i.e. after the receiver start-up process. The start-up impedance is the impedance seen by the transmitter during the start-up process. The start-up process for the multi-drop receiver 43 is from the time the receiver is connected to the transmission line until transmitter soft-start process (described above) is completed. For receiver 43a, the start-up process is from the time receiver 43a is connected to the transmission line until the load controller supply is running and the synchronizer circuit is disabled. See steps 106/108 in flow chart 100, FIG. 7, described below. For both receivers, the receiver initialization sequence is from the time the receiver is connected to the transmission line until the receiver closes its output switch, and is therefore inclusive of the receiver start-up process. See steps 102 through 118 in flow chart 100, FIG. 7.

Please note that either receiver configuration (FIGS. 4 and 5) may be used with transmitter 14 of FIG. 3, but this is not a requirement of this disclosure. Similarly, transmitter 14 may be used with either receiver, but that is also not a requirement of this disclosure.

With respect to both receiver configurations, points 46 and 58 represent the receiver inputs, which connect to the power transmission lines. Components within box 55/55a are considered PET front-end receiver circuitry and components within box 95/95a are considered output control and conditioning circuitry. These two sections of the receiver are delineated by either diodes ($D_1$) 80 and ($D_2$) 81 as shown in FIG. 4, or switches ($S_9$) 45, ($S_{10}$) 48, ($S_{13}$) 62, and ($S_{16}$) 65 as shown in FIG. 5. Components attached to the PET front-end directly measure or impact transmission line characteristics. For example, load controller 44 may perform various measurements on the transmission lines during operation.

Components residing in the output control and conditioning circuit 95/95a perform various functions. Capacitor ($C_2$) 60, referred to as the bootstrap capacitor, supplies capacitance just after the diodes or switches to allow the receiver to operate. For both receivers shown in FIG. 4 and FIG. 5, capacitor ($C_2$) 60 maintains the voltage across the load controller supply 63 (described below) during sample periods. For the receiver 43 shown in FIG. 4, capacitor ($C_2$) 60 serves an additional purpose: to keep diodes ($D_1$) 80 and ($D_2$) 81 reverse biased (i.e. open) during sample periods. Capacitor ($C_2$) 60 may be sized with the minimum amount of capacitance needed to maintain the required minimum voltage across load controller supply 63 during sample periods and, in the case of receiver 43 shown in FIG. 4, to keep diodes ($D_1$) 80 and ($D_2$) 81 reverse biased during sample periods.

If the RC time constant formed by capacitor ($C_2$) 60 and the effective resistance of the load controller supply 63 is less than the RC time constant of the effective transmission line impedance, then capacitor ($C_2$) 60 may potentially discharge to a point where diodes ($D_1$) 80 and ($D_2$) 81 are no longer reverse biased during the sample period. In a simpler implementation, a single diode on the positive leg of the circuit may be used, e.g. just diode ($D_1$) 80.

Also in output control and conditioning circuit 95/95a, is capacitor ($C_3$) 54 referred to as the receiver bulk capacitance. This capacitor acts as local bulk energy storage for the load 50 when the receiver diodes/switches are reverse biased/open. This capacitor is charged during the receiver initialization sequence when the load controller 44 closes switch ($S_{15}$) 64. Bulk capacitor ($C_3$) 54 may be sized based on the maximum desired load current and maximum allowable output voltage ripple.

The peak current is limited via current limiter 57. Switch ($S_{14}$) 61 bypasses the current limiter 57 allowing capacitor ($C_3$) 54 to be directly connected across the output of the receiver. Switch ($S_{11}$) 49 allows the load controller 44 to have control over when power is delivered to the load 50. During startup operations, the load controller 44 may disconnect the load 50 from the circuit. For example, before capacitor ($C_3$) 54 is charged, it is likely that attempting to power the load 50 will cause the voltage across capacitor ($C_2$) 60 and the load controller supply 63 to drop to a point that would cause the receiver to fully turn off during a sample period. Switch ($S_{11}$) 49 allows the load controller 44 to connect the load only when capacitor ($C_3$) 54 is fully charged.

It should be noted that current limiter 57 can be implemented in various ways. For example, in the simplest form, a resistor can be used to limit peak current draw. The value of this resistor would be chosen such that the maximum current is below a predetermined value. Another embodiment of a current limiting circuit may use a resistor with a negative temperature coefficient, or NTC. Such a circuit would initially limit current while the NTC is in a high-resistive state, then allow more current to flow as the NTC heats up and the resistance drops. Alternatively, current limiter 57 could be implemented using an active constant current circuit. Such a circuit would maintain a predetermined constant current, allowing the capacitor to reach the target voltage in a linear, rather than exponential manner. The current limiter 57 and switch ($S_{15}$) 64 may be eliminated entirely if the load controller 44 implements a Pulse-Width Modulation method to control Switch ($S_{14}$) 61 to limit the average and peak currents. The current limiter 57 and switch ($S_{15}$) 64 may also be eliminated if the load controller 44 operates switch ($S_{14}$) 61 in the resistive region to limit the current, possibly in combination with the usage of Pulse-Width Modulation.

Resistor ($R_8$) 51 and switch ($S_{12}$) 59 are a particular embodiment of a bias circuit and may be used to allow the receiver to participate in inline communications. Communication may also occur via communication link 42 over a separate copper or fiber optic connection.

Multi-Drop PET Receiver

Receiver 43 of FIG. 4 is an embodiment of a multi-drop capable receiver. This type of receiver 43 has increased impedance on the front-end circuit 55 compared to prior art receivers, such as those described in Eaves 2012 and Mylenic 2017. Prior art receivers utilize a discrete capacitor disposed across the input terminals to supply a minimum amount of capacitance for the PET protocol to operate. The need for this discrete capacitor has been eliminated, relying instead on the inherent capacitance within the crossline impedance of the transmission line, as well as the capacitance within the PET front-end of the transmitter, e.g. capacitor 27 in transmitter 14 of FIG. 3 in combination with switch capacitance from switches ($S_2$) 22 and ($S_7$) 36.

Prior art receivers also utilize a bulk capacitor, however, this capacitor is in the same position as capacitor ($C_2$) 60 of the receiver and therefore, it contributed significantly to the receiver's start-up input capacitance. This configuration relied on the transmitter soft-start circuitry to manage charging of the capacitance within the effective transmission line impedance, as well as the bulk capacitor. With the receiver shown in FIG. 4, the bulk capacitor found in prior receivers has been split into capacitors ($C_2$) 60, the bootstrap capacitor and ($C_3$) 54, the bulk capacitor to significantly reduce the receiver's start-up input capacitance.

The value of the bootstrap capacitor ($C_2$) 60 is minimized to increase receiver's start-up input impedance. The value of capacitor ($C_3$) 54 can be determined based upon expected maximum load current and allowable output voltage ripple for a given system. The benefit to this approach is it decouples the receiver bulk capacitor ($C_3$) 54 value from the transmitter soft start circuit, as the receiver bulk capacitor ($C_3$) 54 no longer contributes to the receiver's start-up input impedance. This enables systems, such as the multi-drop system depicted in FIG. 11, and discussed in more detail below, with a single transmitter to power multiple receivers with independent loads on a single transmission line pair.

Another factor of the receiver's start-up input impedance is the current/power draw of the down converter and any other non-linear loading components of the load controller supply 63 (discussed below). For at least some topologies of down converters, the current draw is such that, at lower input voltages, there is a larger input current draw in order to regulate the converter output appropriately. If the total current drawn at a given voltage by all down converters in all receivers that are connected to the same transmitter is the same as the available transmitter soft start current, the transmitter will be unable to soft start the receivers further since none of the current is being drawn into the receivers' bootstrap capacitance, preventing the voltage from rising further. In addition to the down converter, other start-up input resistances seen by the transmitter and other non-capacitive power draws will contribute to this restriction and will need to be considered. While resistive input impedances are simpler to account for by calculating the voltage divider formed by these resistances and the transmitter soft start resistance, the non-linear loading components can be more difficult to account for.

One method for addressing the non-linear draw of the down converter of the load controller supply 63 while soft starting is to include in the load controller supply 63 a current limiter on the input to the down converter. With the available transmitter soft start current defined along with the desired maximum number of receivers to be connected to that same transmitter, the amount of current limiting required can be calculated. Another method for addressing the non-linear draw of the down converter is to hold the down converter in an off or low-power state until a desired input voltage is reached. This input voltage could be defined such that, at that given voltage, the current drawn by the down converter is much lower and no longer imposes an excessive restriction on the number of receivers that can be soft started in parallel by the same transmitter. This hold-off technique could be implemented in a number of ways, including a voltage divider that controls a switch, a voltage sensor that controls a switch, and utilizing a down converter that provides such a hold-off control via its interface.

Receiver 43 input impedance may be such that it consumes only a small amount of current from the transmission lines which may be at a magnitude below the level at which the transmitter may detect a fault, with at least a minimum level of margin included. The minimum level of margin would be defined such that the transmitter does not detect a fault that is not actually present by considering in the current draw under normal conditions (i.e. the current drawn by the receivers while soft starting), the minimum level of fault sensitivity, and factors that can affect the measurement; such as tolerance of components, reasonable expected noise, and timing skew. This minimum level of margin should also consider the number of parallel receivers that are designed to be supported that may concurrently draw this magnitude of current due to their parallel configuration. The amount of acceptable current draw and minimum level of margin are device and application specific.

To meet the above impedance requirements, the start-up input impedance (which includes the front end impedance) of the multi-drop PET receiver 43 may be at least two times (2×) higher than an impedance level that would induce or indicate a fault or prevent the transmitter from successfully completing soft start on the at least one energized PET transmission line. In order to provide more margin, the start-up input impedance of the multi-drop PET receiver 43 may be greater than two times (2×) and may be up to or greater than one order of magnitude higher than an impedance level that would induce or indicate a fault or prevent the transmitter from successfully completing soft start on the at least one energized PET transmission line. An order of magnitude is used herein in its typical manner, i.e. the value of the physical quantity is expressed as $a \times 10^b$; where $1 \le a < 10$ and b is a positive or a negative integer. The exponent of 10, here it is b, is called of the order of magnitude. As an example, $1 \times 10^2$ is one order of magnitude greater than $1 \times 10^1$.

Hot Pluggable PET Receiver

FIG. 5 depicts an embodiment of a hotplug capable receiver 43a. This type of receiver may have further increased start-up input impedance compared to the multi-drop capable receiver shown in FIG. 4 and as a result receivers/loads can be hot-plugged/connected to an energized PET system with a transmitter and other receivers already operating, without causing any interruption to power delivery or compromising safety. It should be noted that the hot plug receiver of FIG. 5 could also be used in a multi-drop system, as its start-up input impedance may be even greater than the start-up input impedance of the multi-drop receiver of FIG. 4.

With the receiver of FIG. 5, diodes ($D_1$) 80 and ($D_2$) 81 in FIG. 4 have been replaced by switches ($S_9$) 45, ($S_{10}$) 48, ($S_{13}$) 62 and ($S_{16}$) 65 and synchronizer 52 has been added. These switches isolate the receiver PET front-end 55a from the output control and conditioning circuit 95 in a bi-directional manner, compared to the diodes in FIG. 4, which only isolate in a uni-directional manner. This further increases receiver start-up input impedance for receiver 43a as compared to receiver 43, as all components within the output control and conditioning circuits 95a can be electrically disconnected from the PET front-end 55a regardless of the voltage across switches ($S_9$) 45, ($S_{10}$) 48, ($S_{13}$) 62 and ($S_{16}$) 65. As will be apparent to one skilled in the art, this circuit could be implemented with a single pair of switches, e.g. ($S_{10}$) 48 and ($S_{13}$) 62, operated under the control of synchronizer 52 (during start-up) and load controller 44 after start-up. In the simplest form, the circuit could be implemented with a single switch on the positive leg of the circuit, e.g. ($S_{10}$) 48. In another alternate form, after start-up, the load controller could switch in a diode configuration such as ($D_1$) 80 and ($D_2$) 81 in FIG. 4 or utilize the body diodes of MOSFET switches in order to simplify operation by not needing active switching at the expense of efficiency.

The synchronizer circuit 52 allows the receiver to start up from an unpowered state. It consumes only a small amount of current from the transmission lines which is at a magnitude below the level which the transmitter may detect a fault, with at least a minimum level of margin included. This minimum level of margin would be defined such that the transmitter does not detect a fault that is not actually present by considering in the current draw under normal conditions (i.e. the current drawn by the receivers during the start-up process), the minimum level of fault sensitivity, and factors that can affect the measurement; such as tolerance of components, reasonable expected noise, and timing skew. This minimum level of margin should also consider the number of parallel receivers that are designed to be supported that may concurrently draw this magnitude of current due to their parallel configuration.

To meet the above impedance requirements, the start-up input impedance (which includes the front end impedance) of the hot pluggable PET receiver 43a may be at least two times (2×) higher than an impedance level that would induce or indicate a fault or prevent the transmitter from successfully completing soft start on the at least one energized PET transmission line. In order to provide more margin, the start-up input impedance may be greater than two times (2×) and may be up to or greater than one order of magnitude higher than an impedance level that would induce or indicate a fault on the at least one energized PET transmission line.

Once synchronized to the PET waveform (described below), the synchronizer circuit 52 allows current to flow to charge bootstrap capacitor ($C_2$) 60 and get load controller supply 63 running to supply power to load controller 44. As described above, load controller supply 63 may include a down converter to regulate a higher input voltage down to the voltage level required by the load controller 44. This process may require a plurality of transfer and sample periods to start the load controller supply. Once the load controller supply 63 is running/operational, the load controller 44 disables the synchronizer circuit 52 and the load controller supply 63 powers load controller 44. In addition, load controller 44 begins switching the connected switches ($S_9$) 45 and ($S_{16}$) 65 during subsequent transfer and sample periods to complete the initialization operations before powering the load. This receiver with high start-up input impedance allows for hotplug capability, meaning the receiver can be connected to a running system with a transmitter and other receivers already operating without causing any interruption to power delivery or compromising safety. In other words, it does not draw an amount of current/power to cause the PET transmitter to incorrectly detect a fault.

With regard to the multi-drop PET receiver 43 (FIG. 4) and hot pluggable PET receiver 43a (FIG. 5), some examples of capacitor $C_2$ 60 and $C_3$ 54 sizing are provided. It should be noted, however, that these examples are not limiting, as particular capacitor sizing will depend on the components, devices, and parameters being used as well as the particular applications.

For $C_2$ 60, with an effective cross-line resistance of at most 100 kΩ and effective cross-line capacitance of at most 100 nF seen at the receiver front-end and an effective load controller supply resistance of at least 20 kΩ, the bootstrap capacitance would need to be at least 0.5 µF. With a single receiver front-end receiving power at a duty cycle of 50% and a frequency of 1 kHz, with an effective load controller supply resistance of at least 20 kΩ, to tolerate no more than a 10V ripple, a bootstrap capacitance of at least 0.42 µF is required. Therefore, in this example, a bootstrap capacitance of at least 0.5 µF is required. Larger values can be used to further minimize ripple and provide margin, but the value should otherwise be minimized in order for operational capabilities to be optimized. A system with different parameters must recalculate these values accordingly.

For $C_3$ 54, with a load current of 5A, a single receiver front-end receiving power at a duty cycle of 50% and a frequency of 1 kHz, to tolerate no more than 10V ripple, a bulk capacitance of at least 125 µF is required. Larger values can be used to further minimize ripple and provide margin, but smaller values will optimize cost and component size as well as generally faster initialization times.

For capacitance sizing of both $C_2$ 60 and $C_3$ 54, the minimum amount of capacitance required to allow the receiver to operate must be considered and the ability for the capacitance to be recharged during each transfer period based on the series resistance of the transmission line and any other impedances that would affect the charge rate of that capacitance must also be considered.

Figure 6:
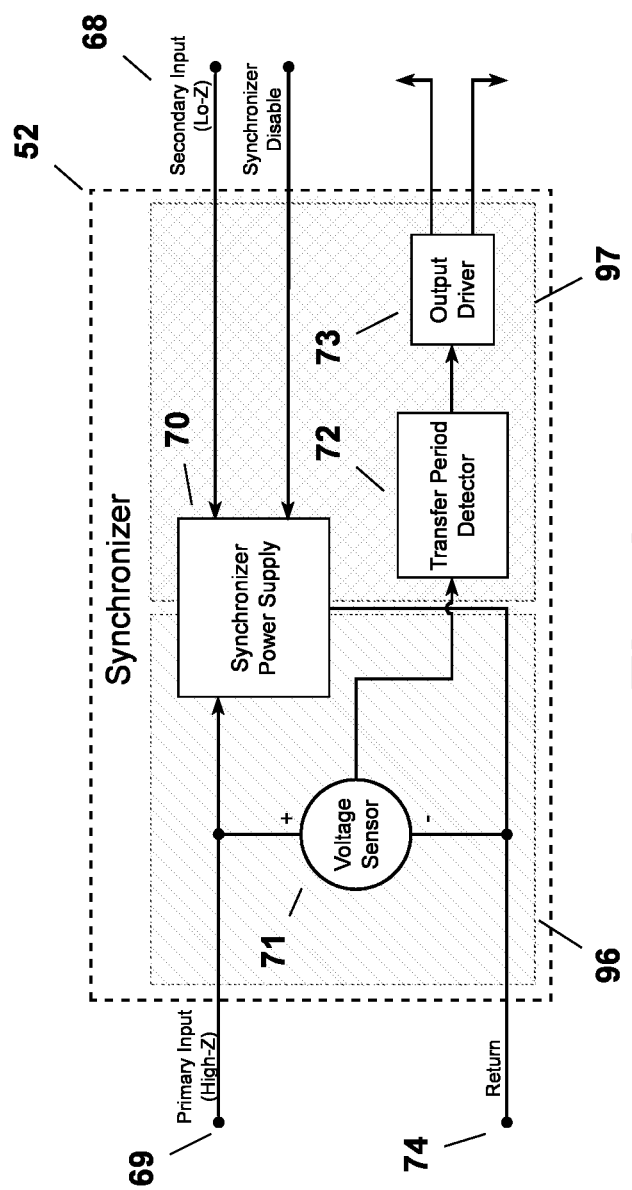
FIG. 6 is a detailed block diagram of an embodiment of a synchronizer.

Referring now to FIG. 6 there is shown a detailed block diagram of the synchronizer circuit 52, within receiver 43a. Synchronizer circuit 52 includes voltage sensor 71 to measure the voltage across the transmission line via points 69 and 74. The transfer period detector 72 processes the output of the voltage sensor to detect the high dV/dt event across the transmission lines (see FIG. 2) occurring at the beginning of the transfer period. Once the start of the transfer period is detected, the transfer period detector instructs the output driver 73 to close the bypass switches ($S_{10}$) 48 and ($S_{13}$) 62 within the receiver 43. Once a predetermined amount of time elapses, the transfer period detector 72 instructs the output driver 73 to open the bypass switches ($S_{10}$) 48 and ($S_{13}$) 62 within the receiver 43, where the predetermined amount of time is at most the total duration of the transfer period, but may be shorter to provide margin and consider other system design constraints.

These same techniques could be performed by analyzing current instead of voltage. For example, the synchronizer circuit 52 could place a small resistance across or in series with the transmission lines and measure the current flowing through the resistor. When the transmitter enters the transfer period, a high rate of change in the current flowing though the resistor could be measured.

A particular embodiment of transfer period detector 72 may consist of an ADC and microcontroller performing analysis of the voltage waveform. Said ADC and microcontroller may be implemented as part of the load controller 44 or as a separate circuit. Another embodiment may utilize comparators, discrete logic gates, and registers, and monostable timer circuits as a detection mechanism.

The voltage sensor 71, transfer period detector 72, and output driver 73 are powered from the synchronizer power supply 70. The steady state power draw of the supply via the primary input 69 is well below the level which could impact measurements made by the transmitter source controller. However, to run the voltage sensor 71, transfer period detector 72 and output driver 73, the synchronizer power supply 70 may need to source more energy than can be sourced directly from the transmission line via primary input 69 without causing measurement disturbances. Therefore, the secondary input 68 is connected after the bypass switch ($S_{10}$) 48 within the receiver and serves as a lower impedance path to allow the synchronizer power supply 70 to maintain operation once synchronized with the transmitter.

Components within box 96 are directly connected to the PET transmission lines and are considered part of the PET front-end circuitry 55a within the receiver 43a. Components within box 97 are considered part of the receiver output control and conditioning circuitry 95a.

Figure 7:
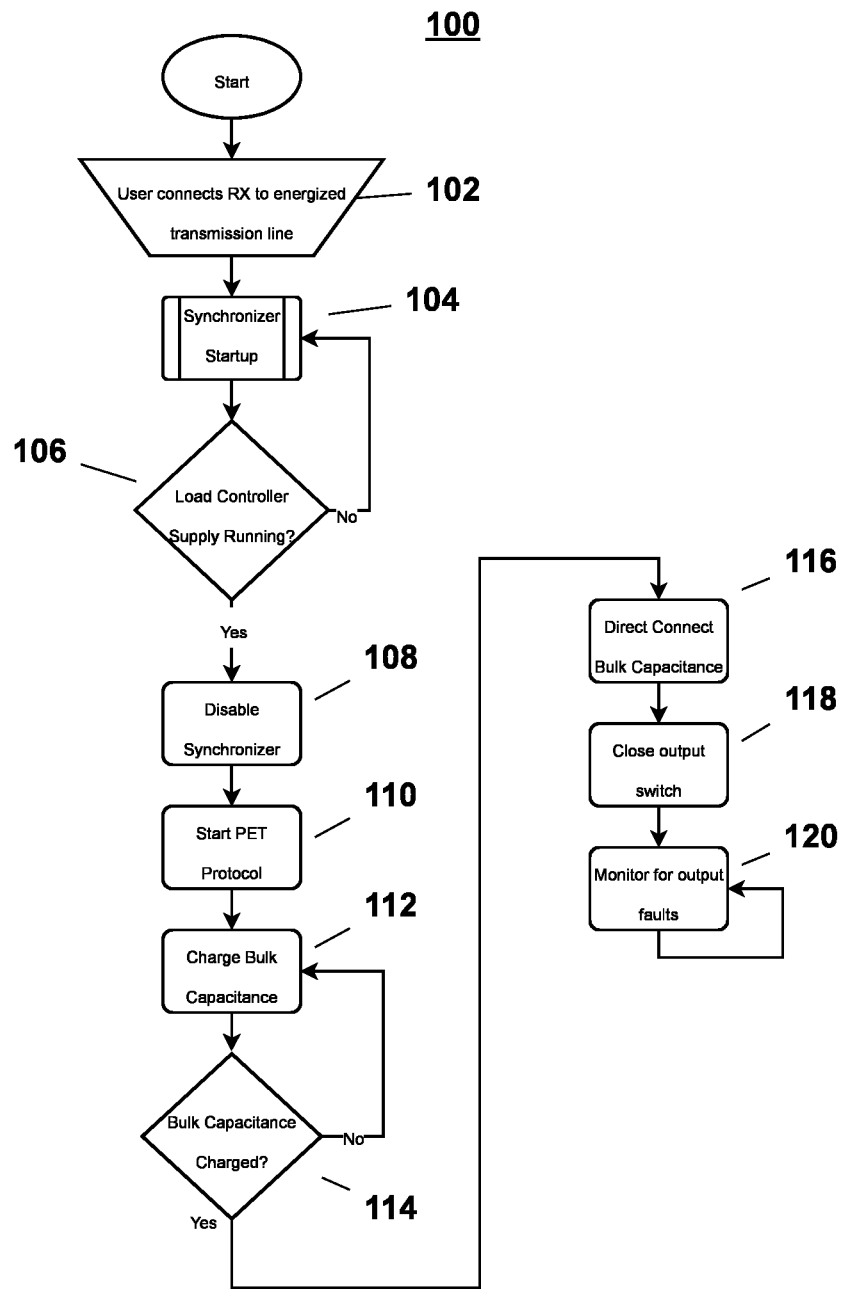
FIG. 7 is a flowchart showing hotplug capable PET receiver startup.
Figure 8:
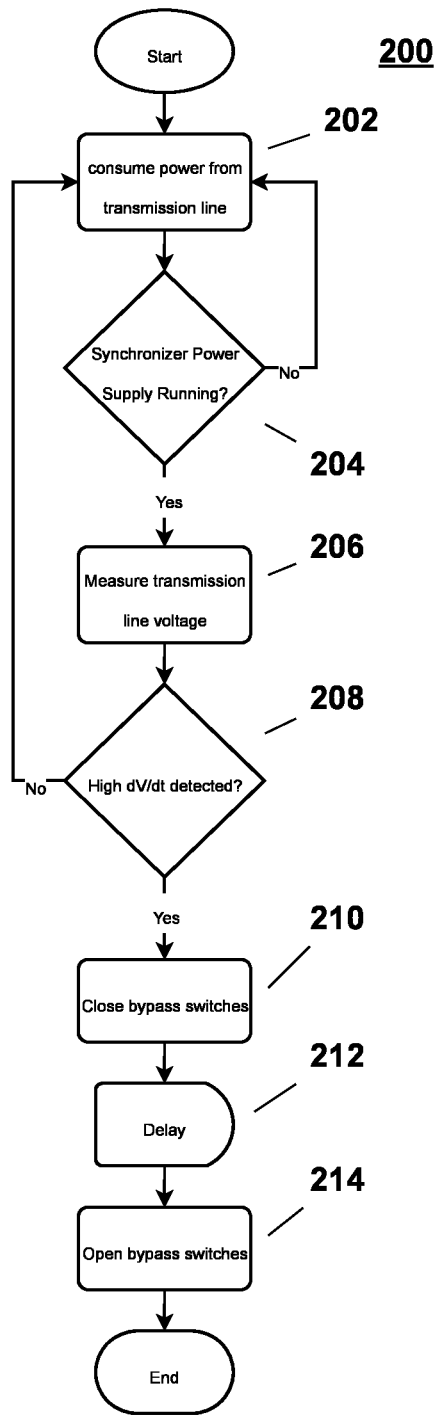
FIG. 8 is a flowchart showing synchronizer operation.

FIG. 7 and FIG. 8 show flowcharts 100 and 200, which detail the initialization sequence for the hotplug capable receiver 43a shown in FIG. 5. The power transmission lines may or may not be actively energized by a transmitter during connection. Upon initial connection to the energized or de-energized transmission lines, the receiver is initially off, with all capacitances discharged and all switches open. Once connected to an energized transmission line, at step 102 of flow chart 100, with a transmitter actively performing the PET protocol, the receiver begins initialization at step 104 via the synchronizer start up process according to flow chart 200 as shown in FIG. 8.

In step 202 of flow chart 200, the synchronizer circuit 52 consumes a small amount of power from the transmission line via the primary (high impedance) input 69, so as to not disturb measurements made by the transmitter source controller during the sample period. In step 202, it is determined if synchronizer circuit 52 is powered and if it is not, the flow returns to step 202 where more power from the transmission line is consumed by synchronizer 52. As determined at step 204, once powered, the synchronizer observes the voltage across the transmission lines, step 206, waiting to detect the high rate of change of voltage (dV/dt), which occurs as the transmitter enters the transfer period. Once a high rate of change of voltage (dV/dt) is detected at step 208, the synchronizer closes switches ($S_{10}$) 48 and ($S_{13}$) 62 at step 210 for a predetermined amount of time, established by delay step 212, allowing energy to flow into capacitor ($C_2$) 60 and the load controller supplies 63. Energy is also allowed to flow into the lower impedance secondary synchronizer input 68 to keep the synchronizer powered. After the predetermined amount of time elapses, delay step 212, at step 214 switches ($S_{10}$) 48 and ($S_{13}$) 62 are opened by the synchronizer 52 before the start of the next sample period.

Referring back to flow chart 100, FIG. 7, the synchronizer startup process, step 104 continues until it is determined that the load controller supply 63 (FIG. 5) has started at step 106. At this point the load controller 44 takes control and at step 108 and synchronizer 52 is disabled by opening switches ($S_{10}$) 48 and ($S_{13}$) 62. At the same time, the receiver start-up process is complete and the load controller also takes control of switches ($S_9$) 45 and ($S_{16}$) 65, closing them during the transfer period and opening them during the sample period, in accordance with the PET protocol which begins at step 110.

Once the load controller 44 has taken over control of the receiver, but before powering the connected load 50, charging of bulk capacitor ($C_3$) 54 begins at step 112 and continues until it is determined at step 114 that the bulk capacitor is fully charged. The load controller closes switch ($S_{15}$) 64 and current limiter 57 limits the peak current. Voltage across bulk capacitor ($C_3$) 54 is measured across points 53 and 56 and once the voltage across capacitor ($C_3$) 54 reaches a predetermined threshold, the load controller closes switch ($S_{14}$) 61, directly connecting bulk capacitor ($C_3$) 54 across the output at step 116 so that bulk capacitor ($C_3$) 54 acts as local bulk energy storage. The load controller then closes switch ($S_{11}$) 49, step 118, delivering energy to the load 50. During transfer periods, this energy is directly supplied to the load 50 from the source attached to the transmitter. During sample periods, capacitor ($C_3$) 54 supplies energy to the load 50. The load controller 44 continuously monitors for output faults, at step 120, until input power is lost.

In a receiver with a single receiver PET front-end 55/55a, as shown in FIG. 4 and FIG. 5, switch (S15) 64 needs to be switched synchronously with the PET waveform, i.e. closed during the transfer period and opened during the sample period. For instance, if switch ($S_{15}$) 64 is closed during the sample period, capacitor ($C_2$) 60 may discharge to a point which causes the load controller supply 63 to turn off, causing the load controller to restart the initialization sequence during the next transfer period.

Figure 9:
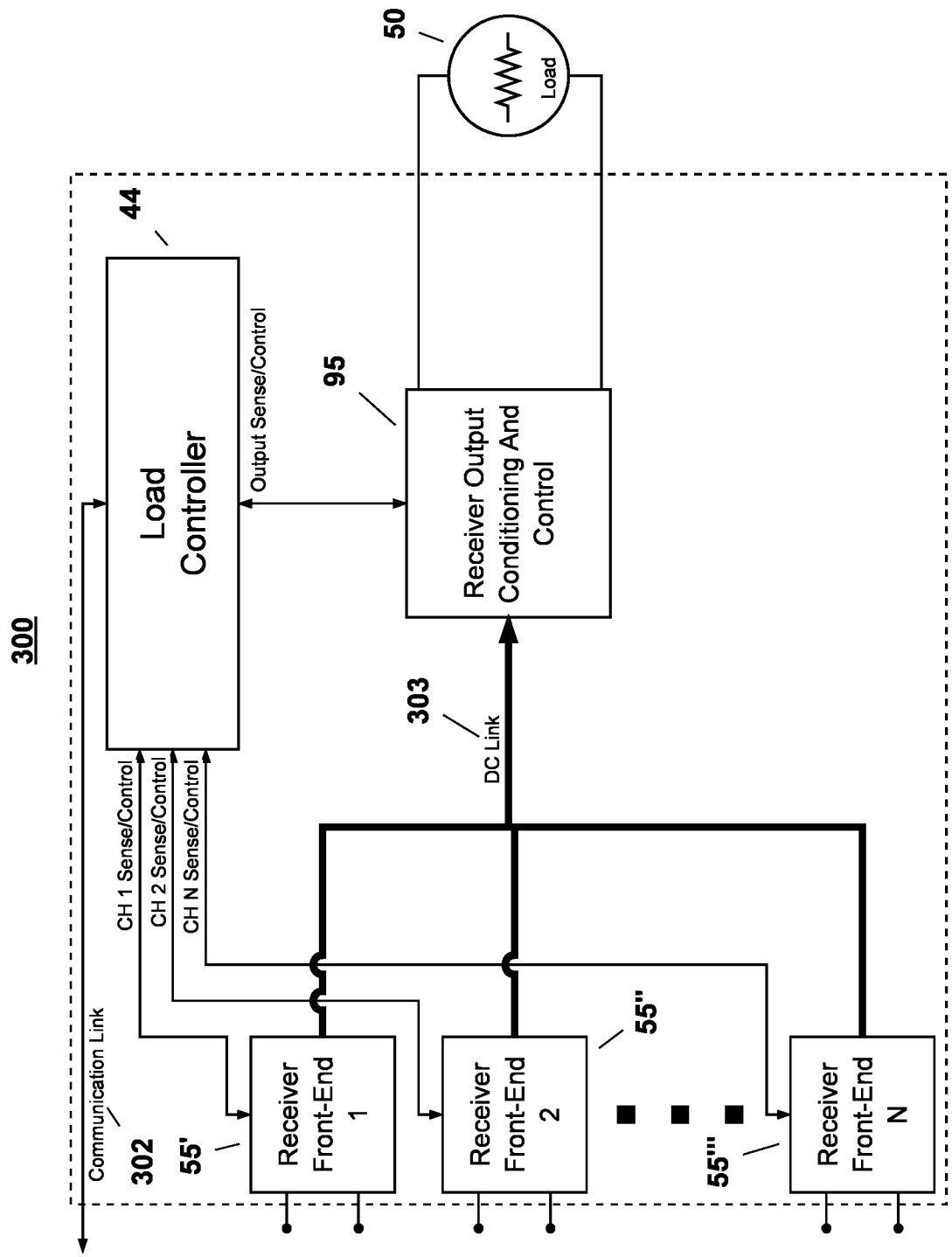
FIG. 9 is a block diagram of an embodiment of a PET receiver with multiple front-end circuits for a digital electricity system.

However, as shown in FIG. 9, receiver 300 with multiple PET front-ends (55', 55" and 55'"), may not need to synchronously switch ($S_{15}$) 64, provided that load controller 44 can verify that at least one input is in the transfer period at all times. One way to accomplish this is for the load controller to verify that at least two or more inputs are active and are phase offset from each other such that the sample periods of each input do not overlap. This is sensed and controlled by CH1, CH2, CHN, lines connected between each PET front-end and controller 44. However, if the PET front-ends (55', 55" and 55'") are not phase offset from each other (i.e. their transfer and sample periods are in synch, then switch ($S_{15}$) 64 may be switched synchronously with the PET waveform, i.e. closed when at least one PET front-end is in the transfer period and opened when all PET front-ends are in the sample period from the plurality of front-ends.

Figure 10:
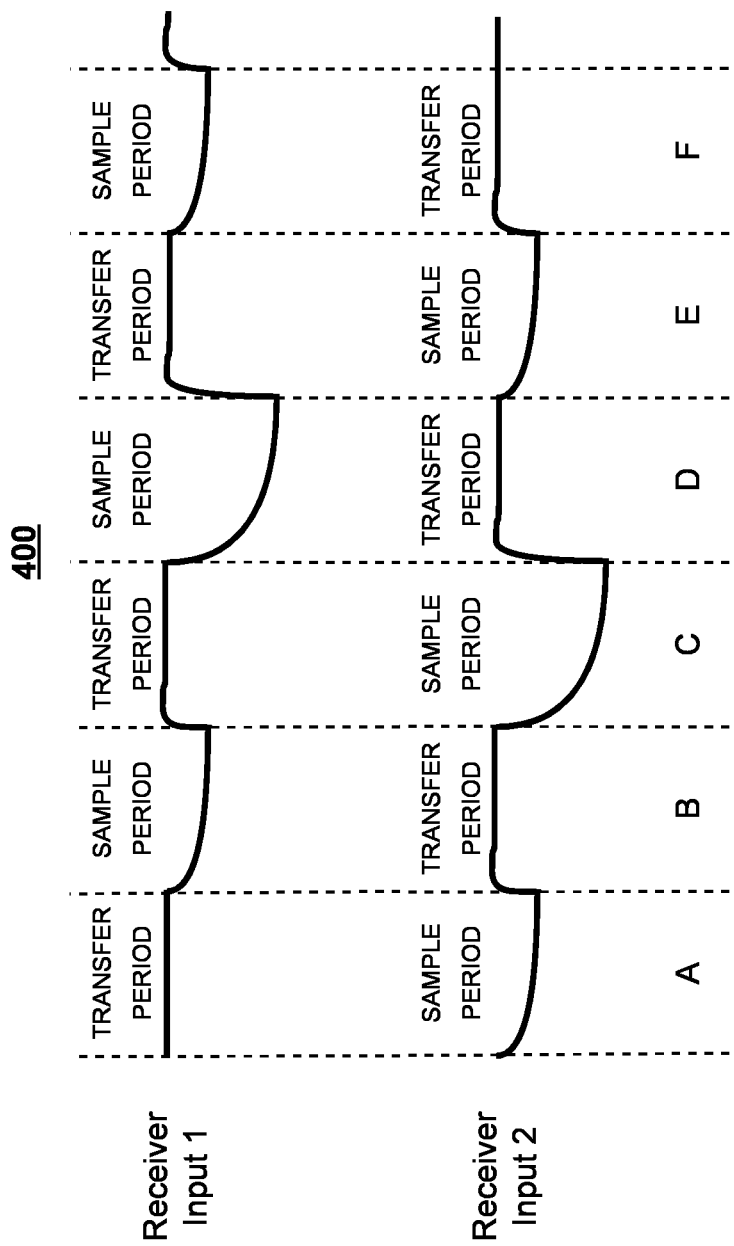
FIG. 10 is an illustration of a PET voltage waveform for the PET receiver of FIG. 9.

The plurality of PET front-ends are connected to receiver output and conditioning and control circuit 95 via DC link 303. Communications link 302 allows for communications between receiver 300 and one or more transmitters (not shown). FIG. 10 shows example waveforms 400 that are 180 degrees offset from each other which would satisfy this requirement for a receiver with two inputs when the transfer period and sample period are the same duration. In such a system, at least one input is guaranteed to be in a transfer period at all times and therefore can supply the current to charge the receiver bulk capacitor ($C_3$) 54.

Referring again to FIG. 4, the combination of load controller 44; diode ($D_1$) 80; diode ($D_2$) 81; capacitor ($C_2$) 60; load controller supply 63; capacitor ($C_3$) 54; switch ($S_{12}$) 59; current limiter 57; switch ($S_{14}$) 61; and switch ($S_{15}$) 64 can be referred to as a multi-drop capable receiver 43.

Referring again to FIG. 5, the combination of load controller 44; switch ($S_9$) 45; switch ($S_{10}$) 48; switch ($S_{11}$) 49; resistor ($R_8$) 51; synchronizer 52; capacitor ($C_2$) 60; load controller supply 63; capacitor ($C_3$) 54; switch ($S_{12}$) 59; current limiter 57; switch ($S_{13}$) 62; switch ($S_{14}$) 61; switch ($S_{15}$) 64; and switch ($S_{16}$) 65 can be referred to as a hotplug capable receiver 43a.

Multi-Drop PET System

Figure 11:
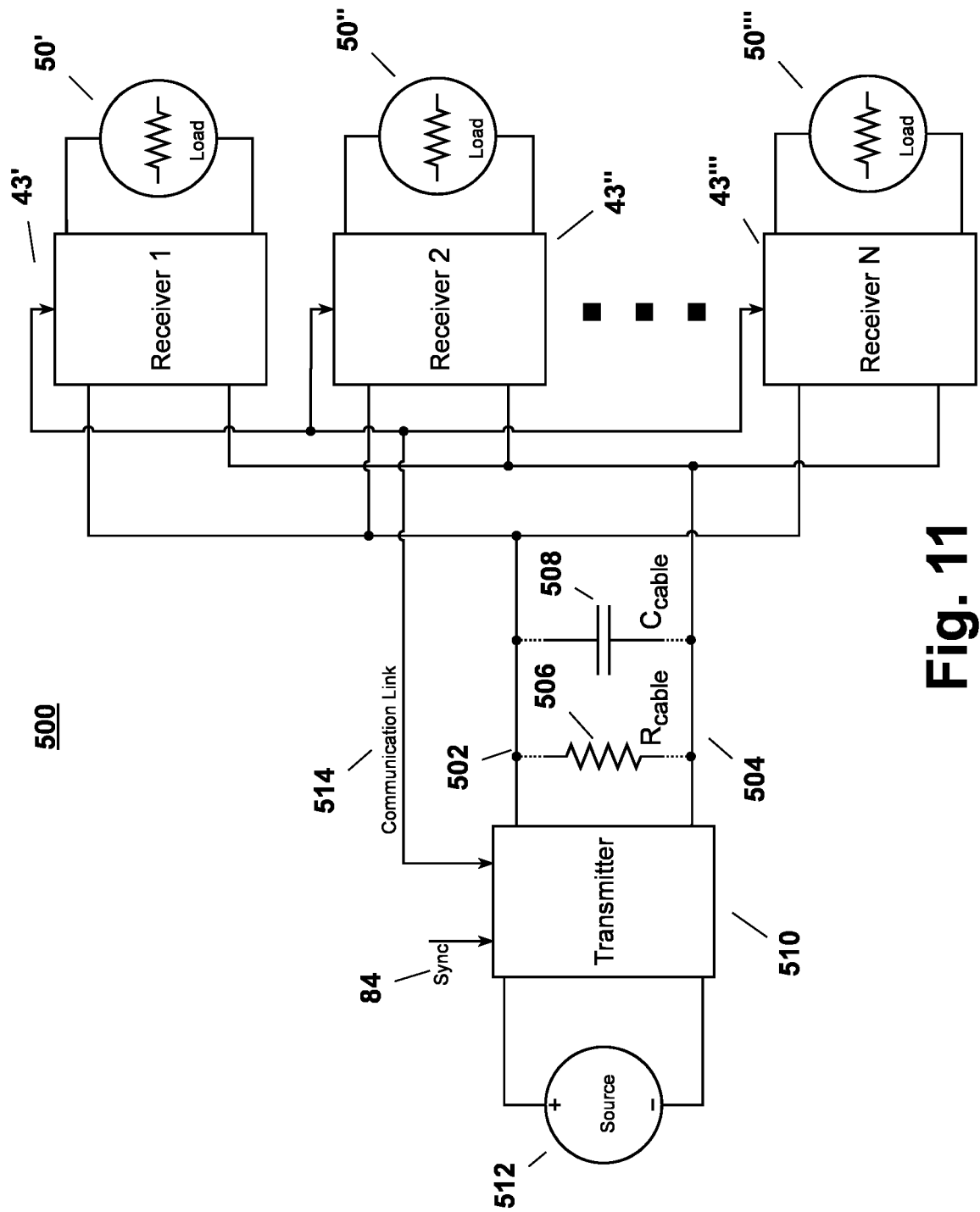
FIG. 11 is a block diagram of a multi-drop digital electricity system with multiple receivers and loads.

Depicted in FIG. 11, is a multi-drop digital PET power system 500, including multiple receivers (1-N), 43', 43", and 43'", each configured as receiver 43 of FIG. 4. As described above, these receivers could be configured as hot pluggable receivers as shown in FIG. 5. The receivers are connected to the same power transmission line 502/504. Here, the effective cross-line impedance consists of the parallel combination of inherent transmission line (502 and 504) cross-line impedance, represented with resistance ($R_{cable}$) 506 and capacitance ($C_{cable}$) 508, the front-end impedance of connected receivers (43', 43", and 43'") and the cross-line impedance of the transmitter 510. Note that the transmitter does not need to be configured as transmitter 14 of FIG. 1, as any suitable PET transmitter could be used. Again, the method for determining the presence of a cross-line fault taught in Eaves 2012 is valid. The transmitter 510 periodically isolates the power transmission lines from the source 512. Similarly, the connected receivers (43', 43", and 43'") isolate the power transmission lines from their loads (50', 50", and 50'") to allow the transmitter 510 to perform measurements on the transmission line (502 and 504).

The maximum number of receivers that can be connected is primarily determined by either the PET receiver front-end impedance or the PET receiver start-up input impedance whichever is more restrictive. For example, reducing the PET receiver front-end impedance by half will approximately double the maximum number of receivers that can be connected. In another example, since the receiver start-up input impedance is inclusive of at least the bootstrap capacitance, reducing the bootstrap capacitance by half will approximately double the maximum number of receivers that can be connected. In prior art devices, there is no bootstrap capacitor ($C_2$) and a much larger bulk capacitor ($C_3$) is located in the front-end same position as capacitor ($C_2$) 60. Since this bulk capacitor was generally sized to support the load connected to the output, the maximum number of receivers that could be connected to the transmission line was limited.

In such a multi-drop system 500 as shown in FIG. 11, it may be necessary to stagger the power-up of each multi-drop capable receiver's load to avoid overloading the transmitter 510 due to inrush current. This can be accomplished in numerous ways. For example, the transmitter 510 can communicate with each receiver via inline communications or via communication link 514. Alternatively, connected receivers may communicate with each other via inline communications or via communication link 514 to determine when each is allowed to start their respective load.

The various embodiments of the disclosure described above are intended to be merely exemplary; numerous variations and modifications will be apparent to those skilled in the art. All such variations and modifications are intended to be within the scope of the present disclosure as defined in any appended claims.

What is claimed is:

1. A packet energy transfer (PET) receiver configured to be electrically connected to at least one energized PET transmission line, the at least one energized PET transmission line configured to be electrically connected to a PET transmitter, the PET receiver comprising:
   receiver front-end circuitry including:
      a front-end input configured to be electrically connected to the at least one energized PET transmission line;
      a front-end output; and
      at least one switch connected at the front-end output;
   receiver output control and conditioning circuity including:
      an input connected to the at least one switch of the receiver front-end circuitry; and
      an output configured to be connected to an electrical load;
   a synchronizer circuit configured to detect a start of a first plurality of transfer periods by the PET transmitter, the synchronizer circuit causing the at least one switch of the receiver front-end circuitry to close in order to allow power to flow into the receiver output control and conditioning circuitry for a predetermined period of time during each of the first plurality of transfer periods and then causing the at least one switch of the receiver front-end circuitry to open in order to prevent power to flow into the receiver output circuitry during a first plurality of sample periods of the PET transmitter; and
   a load controller operably connected to the receiver front-end circuitry, the receiver output control and conditioning circuity, and the synchronizer circuit; wherein after the first plurality of transfer periods, the load controller disables the synchronizer circuit and operates the at least one switch to close the at least one switch in order to allow power to flow into the receiver output control and conditioning circuitry during subsequent transfer periods and to cause the at least one switch to open in order to prevent power to flow into the receiver output circuitry during a subsequent sample periods.

2. The PET receiver of claim 1 wherein the receiver output control and conditioning circuity includes a load controller supply configured to provide power to the load controller.

3. The PET receiver of claim 2 wherein the load controller supply includes a down converter to provide a reduced output voltage to the load controller.

4. The PET receiver of claim 3 wherein the load controller supply includes a current limiter to limit current drawn by the down converter during start-up of the PET receiver.

5. The PET receiver of claim 3 wherein the load controller supply is configured to operate in an off or low power mode to limit current drawn by the down converter during start-up of the PET receiver.

6. The PET receiver of claim 2 wherein after the first plurality of transfer periods and the first plurality of sample periods the load controller supply is operational and begins to provide power to the load controller.

7. The PET receiver of claim 1 having a start-up input impedance that is sufficient to limit a current drawn by the PET receiver to below a current level that would indicate a fault on the at least one energized PET transmission line.

8. The PET receiver of claim 7 wherein the current level drawn by the PET receiver includes at least a minimum level of margin.

9. The PET receiver of claim 1 having a start-up input impedance that is at least two times an impedance level that would indicate a fault on the at least one energized PET transmission line.

10. The PET receiver of claim 9 wherein the start-up input impedance is at least one order of magnitude higher than the impedance level that would indicate a fault on the at least one energized PET transmission line.

11. The PET receiver of claim 1 wherein the at least one switch includes a first pair of switches operated under the control of the synchronizer circuit to close the first pair of switches in order to allow power to flow into the receiver output control and conditioning circuitry for a predetermined period of time during each of the first plurality of transfer periods and then to cause the first pair of switches to open in order to prevent power to flow into the receiver output circuitry during a first plurality of sample periods.

12. The PET receiver of claim 11 wherein the at least one switch includes a second pair of switches operated under the control of the load controller to close the second pair of switches in order to allow power to flow into the receiver output control and conditioning circuitry during the subsequent transfer periods and to cause the second pair of switches to open in order to prevent power to flow into the receiver output circuitry during the subsequent sample periods.

13. The PET receiver of claim 1 wherein the synchronizer circuit includes a voltage sensor to detect a PET transmission line voltage across the receiver front-end input and a detector circuit configured to detect, in response to a PET transmission line voltage, the beginning of each of the first plurality of transfer periods.

14. The PET receiver of claim 1 wherein the receiver front-end circuitry further includes a bias circuit controlled by the load controller to enable communications via the PET transmission line.

15. The PET receiver of claim 2 wherein the receiver output control and conditioning circuity includes a bootstrap capacitor connected across its input to provide power to the load controller supply circuit during the each of the first plurality sample periods and each of the subsequent sample periods.

16. The PET receiver of claim 15 wherein bootstrap capacitor has a capacitance value minimized to maintain a required minimum voltage across the load controller supply.

17. The PET receiver of claim 15 wherein the receiver output control and conditioning circuitry includes a bulk capacitor connected between the load controller supply circuit and the load and further includes a bulk capacitor switch connected in series with the bulk capacitor and operated under the control of the load controller to limit a current supplied to the bulk capacitor when charging.

18. The PET receiver of claim 17 wherein the bulk capacitor has a capacitance value to support a maximum desired load current and a maximum allowable output voltage ripple.

19. The PET receiver of claim 17 wherein the receiver output control and conditioning circuitry includes a load switch under the control of the load controller to selectively connect and disconnect the load to the receiver output control and conditioning circuity.

20. The PET receiver of claim 17 wherein the receiver output control and conditioning circuity includes a current limiter connected in series with the bulk capacitor to limit a current supplied to the bulk capacitor when charging.

21. The PET receiver of claim 20 including a current limiter switch configured to close synchronously with a start of each transfer period and open during a start of each sample period.

22. The PET receiver of claim 13 wherein the synchronizer circuit includes an output driver configured to open and close the at least one switch.

23. The PET receiver of claim 22 wherein the synchronizer circuit includes a synchronizer power supply configured to power the output driver, the voltage sensor, and the transfer period detector.

24. The PET receiver of claim 1 wherein the load controller is configured to sense a voltage on the front-end input of the receiver front-end circuitry during the sample period to determine if a fault is present on the PET transmission line.

25. The PET receiver of claim 2 wherein the receiver front-end circuitry includes a plurality of front-end circuits each including a front-end input configured to be electrically connected to the at least one energized PET transmission line; a front-end output; and
at least one pair of switches connected at the front-end output.

26. The PET receiver of claim 25 wherein the load controller is configured to selectively control connection of each of the plurality of front-end circuits to the receiver output control and conditioning circuity to ensure the sample periods of each of the plurality of front-end circuits do not overlap.

27. The PET receiver of claim 25 wherein the receiver output control and conditioning circuity includes a bulk capacitor connected between the load controller supply circuit and the load and a current limiter with a current limiter switch connected in series with the bulk capacitor to limit a current supplied to the bulk capacitor when charging; and wherein the current limiter switch is configured to close when at least one of the plurality of front-end circuits is in a transfer period and open when all of the plurality of front-end circuits is in a sample period.

28. A packet energy transfer (PET) receiver configured to be electrically connected to at least one energized PET transmission line, the at least one energized PET transmission line configured to be electrically connected to a PET transmitter, the PET receiver comprising:
  receiver front-end circuitry including:
    a front-end input configured to be electrically connected to the at least one energized PET transmission line;
    a front-end output; and
    at least one switch connected at the front-end output;
  receiver output control and conditioning circuitry including:
    an input connected to the at least one switch of the receiver front-end circuitry; and
    an output configured to be connected to an electrical load;
  a synchronizer circuit configured to detect a start of a first plurality of transfer periods by the PET transmitter, the synchronizer circuit causing the at least one switch of the receiver front-end circuitry to close in order to allow power to flow into the receiver output control and conditioning circuitry for a predetermined period of time during each of the first plurality of transfer periods and then causing the at least one switch of the receiver front-end circuitry to open in order to prevent power to flow into the receiver output circuitry during a first plurality of sample periods of the PET transmitter;
  wherein the synchronizer circuit includes:
    a voltage sensor to detect a PET transmission line voltage across the receiver front-end input;
    a detector circuit configured to detect, in response to a PET transmission line voltage, the beginning of each of the first plurality of transfer periods;
    an output driver configured to open and close the at least one switch; and
    a synchronizer power supply configured to power the output driver, the voltage sensor, and the detector circuit; and
  a load controller operably connected to the receiver front-end circuitry, the receiver output control and conditioning circuity, and the synchronizer circuit; wherein after the first plurality of transfer periods, the load controller disables the synchronizer circuit and operates the at least one switch to close the at least one switch in order to allow power to flow into the receiver output control and conditioning circuitry during subsequent transfer periods and to cause the at least one switch to open in order to prevent power to flow into the receiver output circuitry during a subsequent sample periods.

29. The PET receiver of claim 28 wherein the receiver output control and conditioning circuity includes a load controller supply configured to provide power to the load controller.

30. The PET receiver of claim 29 wherein the load controller supply includes a down converter to provide a reduced output voltage to the load controller.

31. The PET receiver of claim 30 wherein the load controller supply includes a current limiter to limit current drawn by the down converter during start-up of the PET receiver.

32. The PET receiver of claim 30 wherein the load controller supply is configured to operate in an off or low power mode to limit current drawn by the down converter during start-up of the PET receiver.

33. The PET receiver of claim 29 wherein after the first plurality of transfer periods and the first plurality of sample periods the load controller supply is operational and begins to provide power to the load controller.

34. The PET receiver of claim 28 having a start-up input impedance that is sufficient to limit a current drawn by the PET receiver to below a current level that would indicate a fault on the at least one energized PET transmission line.

35. The PET receiver of claim 34 wherein the current level drawn by the PET receiver includes at least a minimum level of margin.

36. The PET receiver of claim 28 having a start-up input impedance that is at least two times an impedance level that would indicate a fault on the at least one energized PET transmission line.

37. The PET receiver of claim 36 wherein the start-up input impedance is at least one order of magnitude higher than the impedance level that would indicate a fault on the at least one energized PET transmission line.

38. The PET receiver of claim 28 wherein the at least one switch includes a first pair of switches operated under the control of the synchronizer circuit to close the first pair of switches in order to allow power to flow into the receiver output control and conditioning circuitry for a predetermined period of time during each of the first plurality of transfer periods and then to cause the first pair of switches to open in order to prevent power to flow into the receiver output circuitry during a first plurality of sample periods.

39. The PET receiver of claim 38 wherein the at least one switch includes a second pair of switches operated under the control of the load controller to close the second pair of switches in order to allow power to flow into the receiver output control and conditioning circuitry during the subsequent transfer periods and to cause the second pair of switches to open in order to prevent power to flow into the receiver output circuitry during the subsequent sample periods.

40. The PET receiver of claim 28 wherein the receiver front-end circuitry further includes a bias circuit controlled by the load controller to enable communications via the PET transmission line.

41. The PET receiver of claim 29 wherein the receiver output control and conditioning circuity includes a bootstrap capacitor connected across its input to provide power to the load controller supply circuit during the each of the first plurality sample periods and each of the subsequent sample periods.

42. The PET receiver of claim 41 wherein bootstrap capacitor has a capacitance value minimized to maintain a required minimum voltage across the load controller supply.

43. The PET receiver of claim 41 wherein the receiver output control and conditioning circuity includes a bulk capacitor connected between the load controller supply circuit and the load and further includes a bulk capacitor switch connected in series with the bulk capacitor and operated under the control of the load controller to limit a current supplied to the bulk capacitor when charging.

44. The PET receiver of claim 43 wherein the bulk capacitor has a capacitance value to support a maximum desired load current and a maximum allowable output voltage ripple.

45. The PET receiver of claim 43 wherein the receiver output control and conditioning circuity includes a load switch under the control of the load controller to selectively connect and disconnect the load to the receiver output control and conditioning circuity.

46. The PET receiver of claim 43 wherein the receiver output control and conditioning circuity includes a current limiter connected in series with the bulk capacitor to limit a current supplied to the bulk capacitor when charging.

47. The PET receiver of claim 46 including a current limiter switch configured to close synchronously with a start of each transfer period and open during a start of each sample period.

48. The PET receiver of claim 28 wherein the load controller is configured to sense a voltage on the front-end input of the receiver front-end circuitry during the sample period to determine if a fault is present on the PET transmission line.

49. The PET receiver of claim 29 wherein the receiver front-end circuitry includes a plurality of front-end circuits each including a front-end input configured to be electrically connected to the at least one energized PET transmission line; a front-end output; and at least one pair of switches connected at the front-end output.

50. The PET receiver of claim 49 wherein the load controller is configured to selectively control connection of each of the plurality of front-end circuits to the receiver output control and conditioning circuity to ensure the sample periods of each of the plurality of front-end circuits do not overlap.

51. The PET receiver of claim 49 wherein the receiver output control and conditioning circuity includes a bulk capacitor connected between the load controller supply circuit and the load and a current limiter with a current limiter switch connected in series with the bulk capacitor to limit a current supplied to the bulk capacitor when charging; and wherein the current limiter switch is configured to close when at least one of the plurality of front-end circuits is in a transfer period and open when all of the plurality of front-end circuits is in a sample period.

* * * * *